A. KRISTÉN.
BACK PEDALING COASTER BRAKE.
APPLICATION FILED MAR. 17, 1915.

1,399,711.  Patented Dec. 6, 1921.

Witnesses:
Inventor:

UNITED STATES PATENT OFFICE.

ALFRED KRISTEN, OF FRÖNDENBERG, WESTPHALIA, GERMANY.

BACK-PEDALING COASTER-BRAKE.

1,399,711.  Specification of Letters Patent.  Patented Dec. 6, 1921.

Application filed March 17, 1915. Serial No. 14,950.

(GRANTED UNDER THE PROVISIONS OF THE ACT OF MARCH 3, 1921, 41 STAT. L., 1313.)

*To all whom it may concern:*

Be it known that I, ALFRED KRISTEN, a subject of the Emperor of Germany, and residing at Fröndenberg, Westphalia, Germany, have invented new and useful Improvements in Back-Pedaling Coaster-Brakes, of which the following is a specification.

This invention relates to back pedaling coaster brakes in connection with an auxiliary clutch and it has for its object the arrangement and use of special springs which in combination with the brake mantle have sufficient contact area for friction to render the brake prompt and reliable in action and which permits the cycle to be backed.

Figure 1:
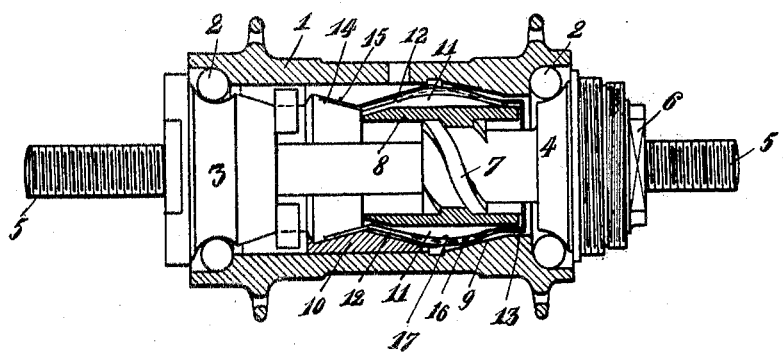
Figure 2:
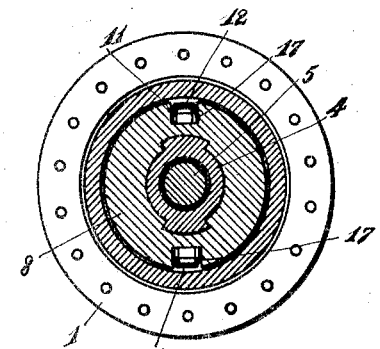
Figure 3:
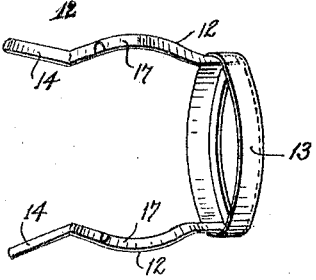

In the accompanying drawings, Figure 1 is a longitudinal central section of a wheel hub provided with my improved device, Fig. 2 is a transverse section of Fig. 1, Fig. 3 is a perspective view of the springs.

Like letters of reference refer to like parts in the several figures.

5 is the rear axle of a bicycle secured as usual in the fork arms of the frame and 1 is the wheel hub or barrel journaled on the rigid cone 3 and the driving cone 4 by ball bearings 2 of any suitable construction. The cone 4 is revoluble in a known manner by means of ball bearings on a cone 6 screwed to shaft 5 and is in connection by means of the thread 7 with the clutch 8 forming a double cone. The right hand cone of this clutch coincides with the internal cone 9 of the hub and forms with the latter the driving clutch; the left hand cone is in connection with the conical or beveled brake sleeve 10 and forms therewith the brake clutch. 11 are grooves provided in the said clutch, as shown for receiving springs 12 which are secured in their position by means of a cup 13 that is held on its place in any suitable manner. As will be clearly understood particularly from Fig. 3 the cup member 13 fits snugly upon the rear end of the double cone. I prefer to construct the springs 12 for stiffening purposes with lateral flanges 17 said springs having thus a U shaped section within their opposing grooves 11. The free ends 14 of the springs are inclined or beveled and faced half circular to fit snugly the beveled internal portion 15 of the brake sleeve 10, producing thus a considerable friction by which the double cone 8 is drawn toward the cone 3, the left hand portion of the double cone 8 and its adjacent cone of the brake sleeve 10 being brought in close contact and a powerful friction is established. As will be understood from Fig. 1 the opposed springs 12 extend somewhat over their grooves at 16 so that they are pressed together when the double cone 8 is shifted longitudinally by the action of the driving cone 4, the said projecting portions 16 of the springs 12 contacting the internal beveled face 9 of the hub, the spring ends 14 being disengaged from their contacting faces 15 and no friction whatever takes place.

What I claim and desire to secure by Letters Patent is:

In a coaster brake comprising a clutch member provided with longitudinal grooves, a spring retarder, comprising springs mounted in said grooves and held in place by a cup shaped member at one end of the clutch member, the other ends of the springs having a surface in contact with a non rotative member of the brake.

ALFRED KRISTEN.

Witnesses:
 HELEN NUFER,
 ALBERT NUFER.